US011823018B1

(12) United States Patent
Hung et al.

(10) Patent No.: US 11,823,018 B1
(45) Date of Patent: Nov. 21, 2023

(54) METHOD, PRODUCT, AND APPARATUS FOR A MACHINE LEARNING PROCESS USING WEIGHT SHARING WITHIN A SYSTOLIC ARRAY HAVING REDUCED MEMORY BANDWIDTH

(71) Applicant: Cadence Design Systems, Inc., San Jose, CA (US)

(72) Inventors: Ngai Ngai William Hung, San Jose, CA (US); Yong Liu, Cupertino, CA (US); Michael Patrick Zimmer, Chicago, IL (US)

(73) Assignee: Cadence Design Systems, Inc., San Jose, CA (US)

( * ) Notice: Subject to any disclaimer, the term of this patent is extended or adjusted under 35 U.S.C. 154(b) by 490 days.

(21) Appl. No.: 16/946,670

(22) Filed: Jun. 30, 2020

(51) Int. Cl.
  G06F 17/16 (2006.01)
  G06N 20/00 (2019.01)
  G06N 3/08 (2023.01)
  G06F 15/80 (2006.01)

(52) U.S. Cl.
  CPC ........ *G06N 20/00* (2019.01); *G06F 15/8046* (2013.01); *G06F 17/16* (2013.01); *G06N 3/08* (2013.01)

(58) Field of Classification Search
  None
  See application file for complete search history.

(56) References Cited

U.S. PATENT DOCUMENTS

| | | |
|---|---|---|
| 5,267,185 A | 11/1993 | Akabane et al. |
| 7,945,528 B2 * | 5/2011 | Cytron .............. G06F 16/90344 706/62 |
| 9,128,697 B1 | 9/2015 | Potter et al. |
| 9,330,167 B1 | 5/2016 | Pendar |
| 10,643,705 B2 | 5/2020 | Choi et al. |
| 10,817,260 B1 | 10/2020 | Huang et al. |
| 2010/0306300 A1 | 12/2010 | Lu et al. |
| 2016/0342890 A1 * | 11/2016 | Young ..................... G06N 3/08 |
| 2018/0165574 A1 | 6/2018 | Young et al. |

(Continued)

OTHER PUBLICATIONS

Ankur6ue. (Jul. 30, 2018). Understanding Matrix Multiplication on a Weight-Stationary Systolic Architecture. Retrieved from TELESENS: http://www.telesens.co/2018/07/30/systolic-architectures/.

(Continued)

*Primary Examiner* — Xuyang Xia
(74) *Attorney, Agent, or Firm* — Vista IP Law Group, LLP

(57) ABSTRACT

An approach is described for a method, product, and apparatus for a machine learning process using weight sharing within a systolic array having reduced memory bandwidth. According to some embodiments, this approach includes providing a systolic array that includes processing elements which each have some number of storage elements for storing weights. For example, the weights can be reused for different data sets by identifying/capturing a current state of the storage elements, generating a plan to transition to a target state of those storage elements, and application of the transition plan such that weights that are already stored in those storage elements can be reused and/or relocate. This lowers the bandwidth requirements for weight memory by allowing weights that have previously been read into the systolic array to be reused.

20 Claims, 11 Drawing Sheets

(56) References Cited

U.S. PATENT DOCUMENTS

| | | | |
|---|---|---|---|
| 2018/0307968 A1* | 10/2018 | Bose | G06N 3/082 |
| 2018/0314671 A1* | 11/2018 | Zhang | G06N 3/063 |
| 2019/0012296 A1 | 1/2019 | Hsieh et al. | |
| 2019/0042237 A1 | 2/2019 | Azizi et al. | |
| 2019/0236049 A1 | 8/2019 | Vantrease et al. | |
| 2019/0244086 A1 | 8/2019 | Franca-Neto | |
| 2020/0097442 A1 | 3/2020 | Jacob (Yaakov) et al. | |
| 2020/0244282 A1 | 7/2020 | Bajic et al. | |
| 2020/0372124 A1* | 11/2020 | Ting | G06F 30/33 |
| 2020/0410036 A1 | 12/2020 | Huynh et al. | |
| 2021/0035258 A1 | 2/2021 | Ray et al. | |
| 2021/0064992 A1 | 3/2021 | Park et al. | |
| 2021/0124794 A1 | 4/2021 | Nair et al. | |
| 2021/0157767 A1 | 5/2021 | Ross et al. | |
| 2021/0256360 A1 | 8/2021 | Nam | |
| 2021/0271451 A1 | 9/2021 | Nair et al. | |
| 2021/0303909 A1 | 9/2021 | Gunnam et al. | |
| 2021/0326686 A1 | 10/2021 | Abdelaziz et al. | |
| 2021/0377122 A1 | 12/2021 | Pennello | |
| 2022/0076066 A1 | 3/2022 | Forgeat et al. | |
| 2022/0129521 A1* | 4/2022 | Surti | G06F 7/588 |

OTHER PUBLICATIONS

Brownlee, J. (Jul. 23, 2018). When to Use MLP, CNN, and RNN Neural Networks. Retrieved from Machine Learning Mastery: https://machinelearningmastery.com/when-to-use-mlp-cnn-and-rnn-neural-networks/.

So, G. (Mar. 28, 2019). Should We Abandon LSTM for CNN? Retrieved from Medium: https://medium.com/ai-ml-at-symantec/should-we-abandon-lstm-for-cnn-83accaeb93d6.

Non-Final Office Action for U.S. Appl. No. 16/946,675 dated Jun. 17, 2022.

Non-Final Office Action for U.S. Appl. No. 16/946,672 dated Jun. 8, 2022.

Non-Final Office Action for U.S. Appl. No. 16/946,671 dated Mar. 2, 2022.

Yin et al., "Parana: A Parallel Neural Architecture Considering Thermal Problem of 3D Stacked Memory", IEEE Transactions on Parallel and Distributed Systems, vol. 30, No. 1, Jan. 2019, pp. 146-160.

Ahmad, S., et al., "Xilinx First 7nm Device: Versal AI Core (VC1902)," Xilinx Inc, dated Aug. 20, 2019.

Prieto, R., "Implementation of an 8-bit Dynamic Fixed-Point Convolutional Neural Network for Human Sign Language Recognition on a Xilinx FPGA Board," Department of Electrical and Information Technology Lund University, dated Mar. 17, 2019.

Jawandhiya, P., "Hardware Design for Machine Learning," International Journal of Artificial Intelligence and Applications (IJAIA), vol. 9, No. 1, dated Jan. 2018.

"Dell EMC Ready Solutions for AI—Deep Learning with Intel," Measuring performance and capability of deep learning use cases, Dell EMC, dated Jun. 2019.

Mayannavar, S., et al., "Hardware Accelerators for Neural Processing," International Journal of Computer Information Systems and Industrial Management Applications, ISSN 2150-7988 vol. 11 (2019) pp. 046-054, dated Apr. 17, 2019.

Non-Final Office Action dated Jul. 25, 2022 U.S. Appl. No. 16/946,673.

Kung et al., "Adaptive Tiling: Applying Fixed-size Systolic Arrays to Sparse Convolutional Neural Networks", 2018 24th International Conference on Pattern Recognition (ICPR) Beijing, China, (Aug. 20-24, 2018).

Final Office Action dated Sep. 1, 2022 for U.S. Appl. No. 16/946,671.

Shao, "Lab 2: Systolic Arrays and Dataflows", UC Berkeley, Feb. 10, 2020, pp. 1-15. Retrieved from the Internet < URL: https://inst.eecs.berkeley.edu/~ee290-2/sp20/>.

Github, "Gemmini—Berkeley's Systolic Array Generator", Apr. 26, 2020, 7 pages. Retrieved from the Internet < URL: https://web.archive.org/web/20200426231646/https://github.com/ucb-bar/gemmini >.

Su et al., "A Comparison of Single-Buffer and Double-Buffer Design in a Systolic Array Generator", Journal of Physics: Conference Series 1693, Nov. 9, 2020, pp. 1-6.

Non-Final Office Action dated Oct. 3, 2022 for U.S. Appl. No. 16/946,674.

Notice of Allowance for U.S. Appl. No. 16/946,672 dated Jan. 9, 2023.

Notice of Allowance date Nov. 1, 2022 for U.S. Appl. No. 16/946,675.

Final Office Action dated Nov. 2, 2022 for U.S. Appl. No. 16/946,673.

Notice of Allowance for U.S. Appl. No. 16/946,673 dated Feb. 1, 2023.

Notice of Allowance for U.S. Appl. No. 16/946,674 dated Feb. 2, 2023.

Yin et al., "A High Energy Efficient Reconfigurable Hybrid Neural Network Processor for Deep Learning Applications", Dec. 2017, pp. 968-982 (Year: 2017).

Non-Final Office Action dated Jul. 11, 2023 for U.S. Appl. No. 16/946,671.

* cited by examiner

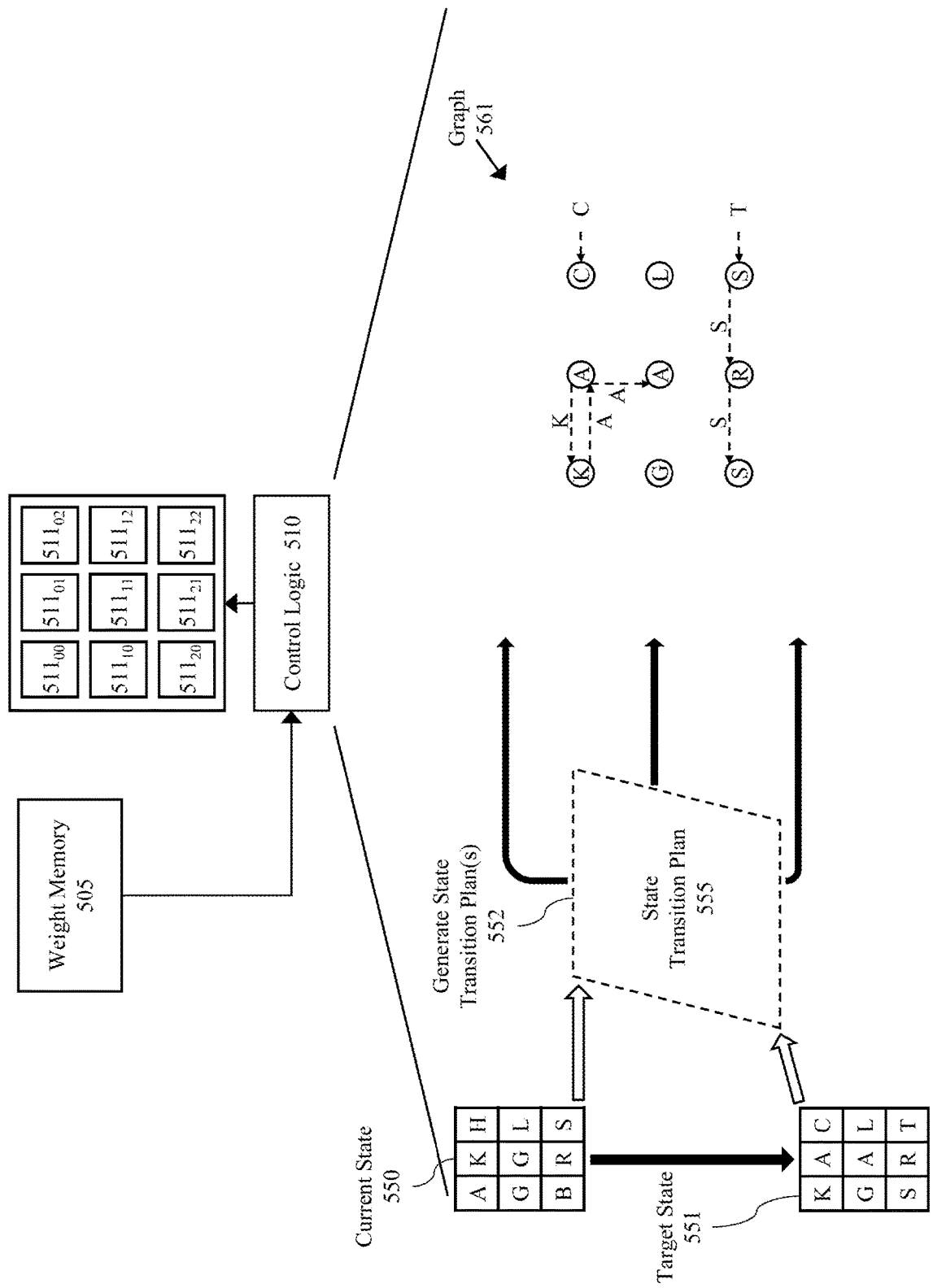

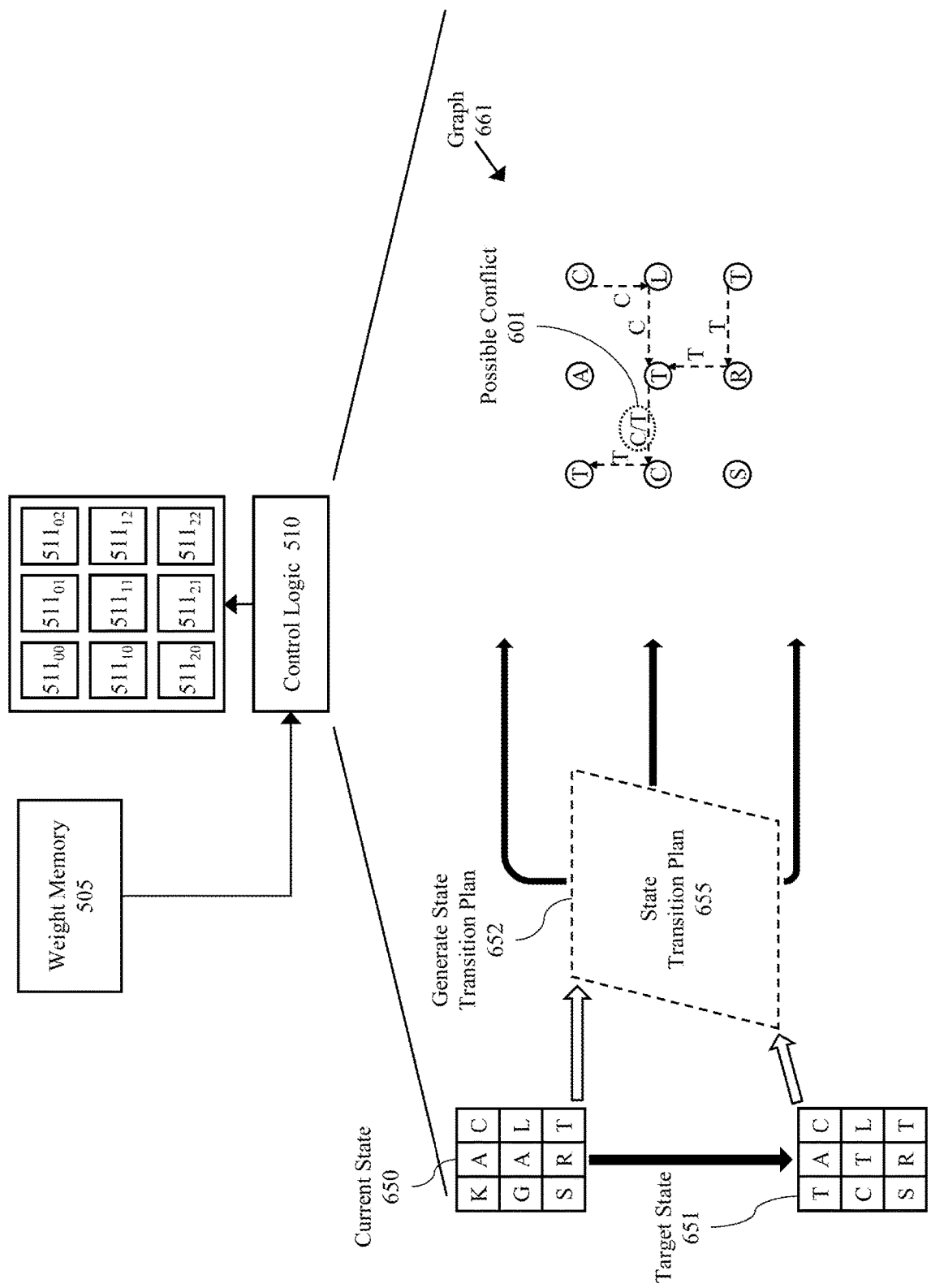

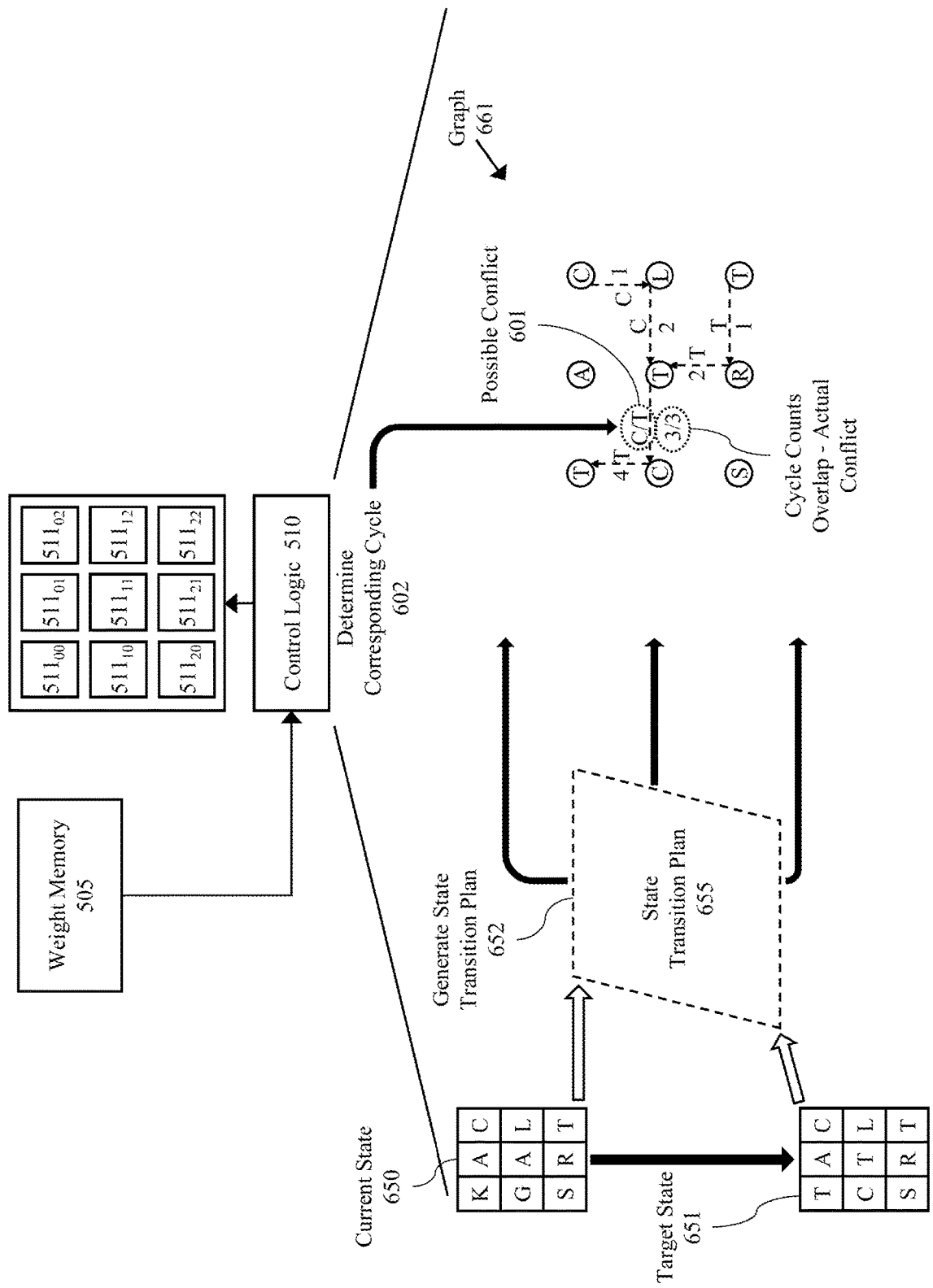

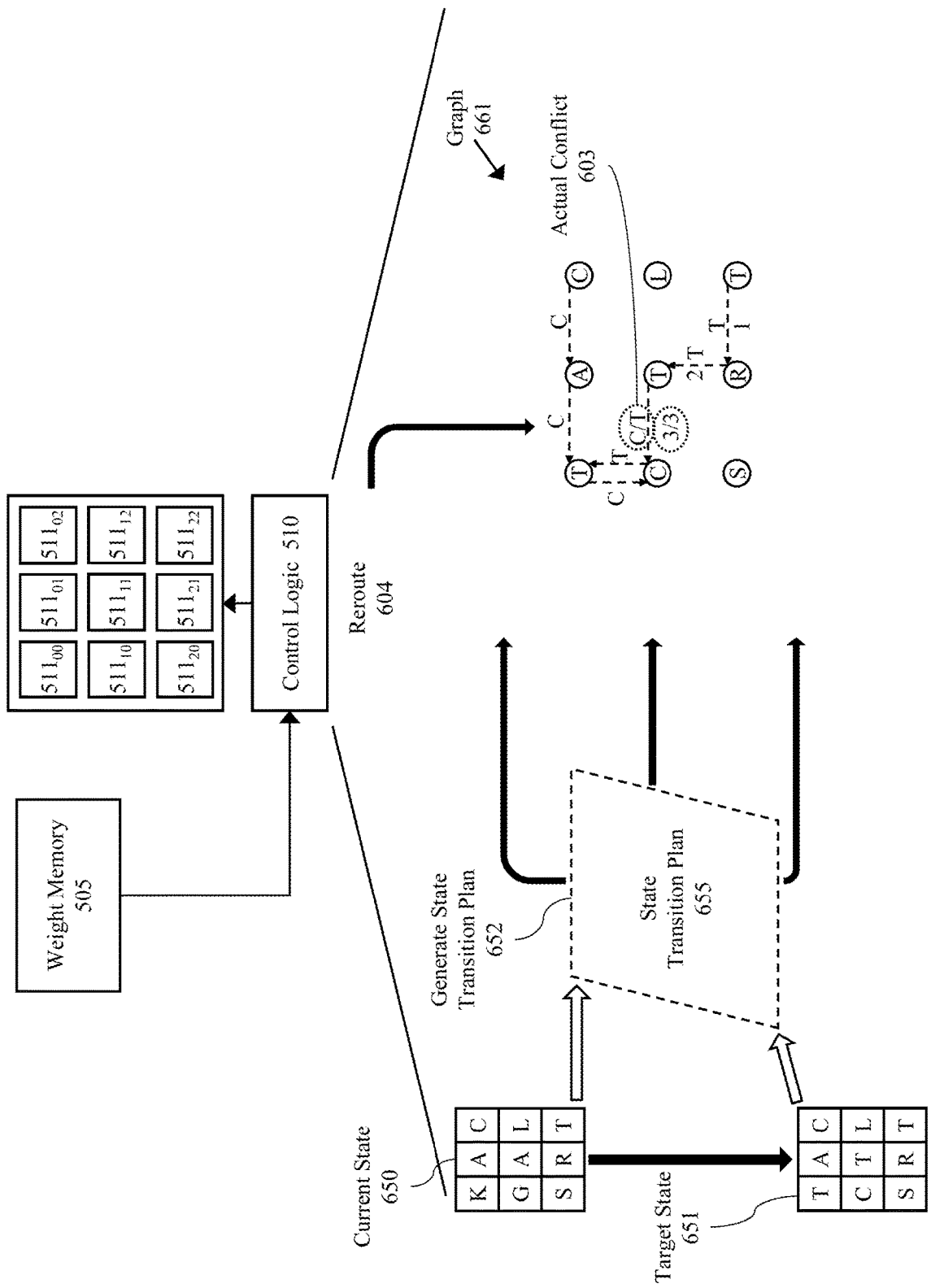

METHOD, PRODUCT, AND APPARATUS FOR A MACHINE LEARNING PROCESS USING WEIGHT SHARING WITHIN A SYSTOLIC ARRAY HAVING REDUCED MEMORY BANDWIDTH

RELATED APPLICATIONS

The present application is related to co-pending U.S. patent application Ser. No. 16/946,674 titled "METHOD, PRODUCT, AND APPARATUS FOR A MULTIDIMENSIONAL PROCESSING ARRAY FOR HARDWARE ACCELERATION OF CONVOLUTIONAL NEURAL NETWORK INFERENCE" now issued as U.S. Pat. No. 11,687,831, U.S. patent application Ser. No. 16/946,675 titled "METHOD, PRODUCT, AND APPARATUS FOR VARIABLE PRECISION WEIGHT MANAGEMENT FOR NEURAL NETWORKS" now issued as U.S. Pat. No. 11,615,320, U.S. patent application Ser. No. 16/946,673 titled "METHOD, PRODUCT, AND APPARATUS FOR A MACHINE LEARNING PROCESS LEVERAGING INPUT SPARSITY ON A PIXEL BY PIXEL BASIS" now issued as U.S. Pat. No. 11,676,068, U.S. patent application Ser. No. 16/946,672 titled "METHOD, PRODUCT, AND APPARATUS FOR A MACHINE LEARNING PROCESS USING DYNAMIC REARRANGEMENT OF SPARSE DATA AND CORRESPONDING WEIGHTS" now issued as U.S. Pat. No. 11,651,283, U.S. patent application Ser. No. 16/946,671 titled "METHOD, PRODUCT, AND APPARATUS FOR A MACHINE LEARNING PROCESS USING A SYSTOLIC ARRAY WITH MULTIMODAL WEIGHT MANAGEMENT" filed on even date herewith, which are hereby incorporated by reference in their entirety.

FIELD

This disclosure pertains to machine learning processing and systolic arrays.

BACKGROUND

The increase of the computing capacity of computing devices and the interconnection of those devices has enabled multiple uses for artificial intelligence. For instance, artificial intelligence can now be found in digital personal assistants and various informational websites. Additionally, artificial intelligence has seen substantial use in image processing fields, such as in recognition of objects (e.g., an AI system in a car recognizing a pedestrian) and other types of image processing.

Various types of techniques have been employed to implement AI and machine learning. For example, one particularly dominant approach to AI is the processing of data using neural networks such as those used in deep learning techniques. Neural networks generally comprise a logical collection of logical nodes connected to other nodes by one or more weighted connections. These logical nodes are arranged in logical layers where each node is associated with the performance of the same type of operations and a plurality of nodes are provided in each layer. For instance, one common type of operation used for convolutional neural networks are multiply accumulate operations.

Systolic arrays are often used to process the data operated on by neural networks. Generally, systolic arrays receive one or more pieces of input data and corresponding weights each cycle, execute multiply and accumulate (MAC) operations on the input data using the corresponding weights, and pass the result of the MAC operations to subsequent cell for accumulation at a subsequent cell or for output from the systolic array. However, without more, the data and weights must be input into the systolic array for each and every piece of data. As a result, systolic arrays often require large amounts of memory bandwidth to fetch the data and weights. In fact, for each piece of input data, there is generally a multiplier effect where each piece of data is associated with multiple weights. For example, if the kernel is 1×1, has 3 input channels, and 3 output channels, there are 3×3=9 weights per pixel.

Thus, what is needed is an improved method, product, and apparatus decreasing the memory bandwidth required for machine learning processing.

SUMMARY

Embodiments of the present invention provide an approach for a method, product, and apparatus for a machine learning process using weight sharing within a systolic array having reduced memory bandwidth.

According to some embodiments, this approach includes providing a systolic array that includes processing elements (PEs) which each has some number of storage elements for storing weights. For example, the weights can be reused for different data sets by identifying/capturing a current state of the storage elements, generating a plan to transition to a target state of those storage elements, and application of the transition plan such that weights that are already stored in those storage elements can be reused and/or relocate. This lowers the bandwidth requirements for weight memory by allowing weights that have previously been read into the systolic array to be reused.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

FIGS. 5A-B provide an illustrative example of generating a state transition plan according to some embodiments.

FIGS. 6A-C provide an illustrative example of a conflict resolution process for an illustrative state transition plan according to some embodiments.

DETAILED DESCRIPTION

Embodiments of the present invention provide an approach for a method, product, and apparatus for a machine learning process using weight sharing within a systolic array having reduced memory bandwidth.

The systolic array with weight sharing can be provided using only a single systolic array or multiple interconnected systolic arrays. Therefore, for machine learning jobs (e.g., inference on an image or set of images using a particular machine learning configuration), characteristics of a particular machine learning job can be analyzed dynamically determine how to reuse weights for that machine learning job. As a result, the bandwidth requirements of the systolic array can be lowered, easing design constraints and potentially decoupling memory bandwidth limitations from systolic processing limitations.

The operation of the systolic array is described below in context of a larger system in regard to at least FIG. 1A.

Figure 1A:
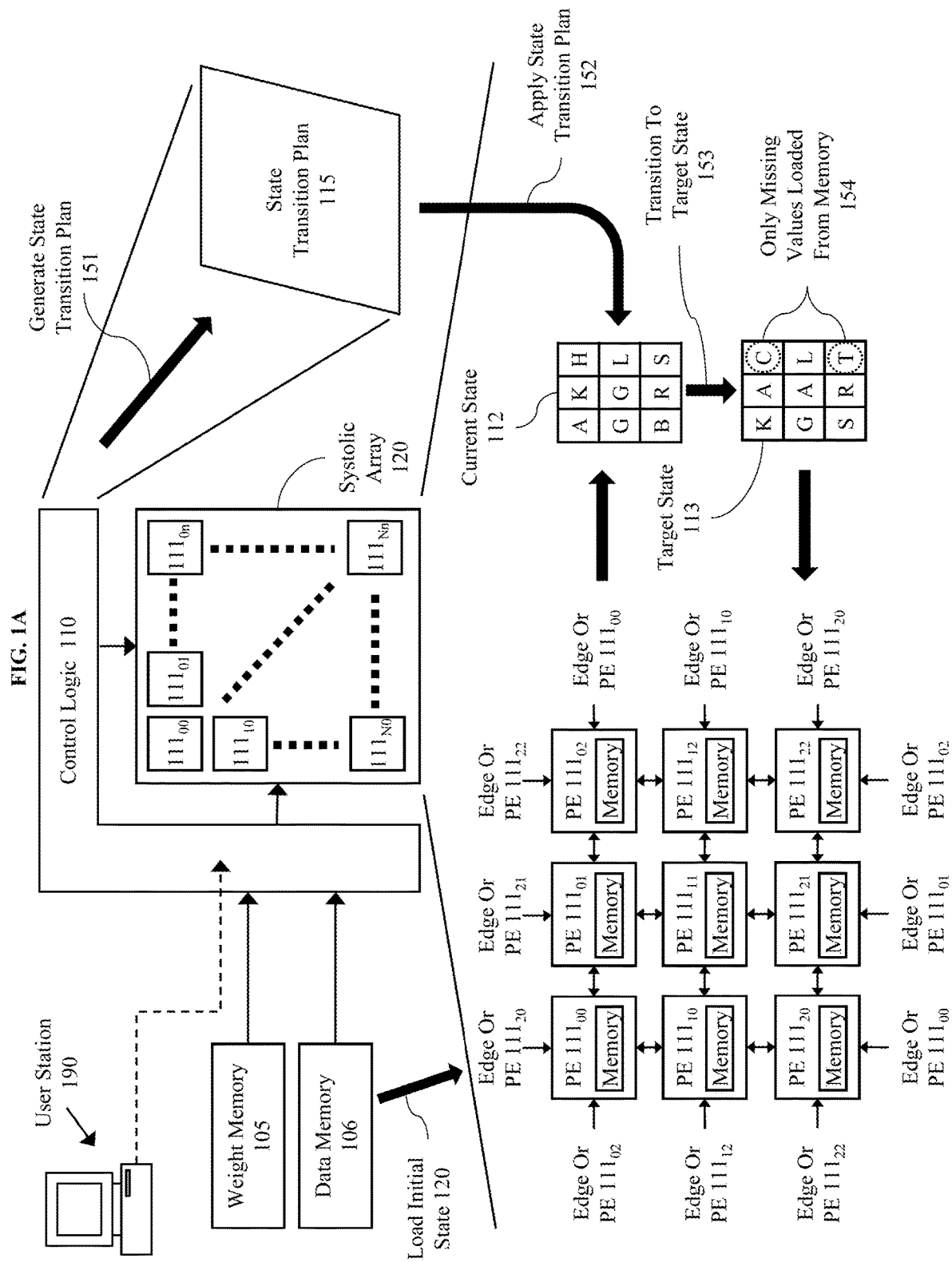
FIG. 1A depicts an example system including an arrangement with a systolic array that can reuse/relocate weights according to some embodiments.

FIG. 1A depicts an example system including an arrangement with a systolic array that can reuse/relocate weights according to some embodiments. Generally, the system executes machine learning processing jobs using an approach that both maintains weights in the systolic array and transitions the systolic array to a new state using available weights already stored in the systolic array.

The system as illustrated includes multiple components including a weight memory 105, data memory 106, control logic 110, a systolic array 120, and a user station 190. In some embodiments, all of items 105, 106, 110, and 120 are included. However, in some embodiments these items are provided alone or in any combination. For instance, weight memory 105 and the data memory 106 might comprise different portions of the same underlying physical memory.

The control logic 110 may receive a machine learning processing job from a user station 190. The user station 190 comprises any type of computing station that is useable to operate or interface with a database or other computing device, such as one that might store, perhaps temporarily, or have a machine learning processing job. Examples of such user stations include workstations, personal computers, phones, tablets, or remote computing terminals. In some embodiments, the user station 190 comprises a display device, such as a display monitor, for displaying a user interface to users at the user station. The user station 190 also comprises one or more input devices for the user to provide operational control over the user station, such as a mouse, keyboard, or touch screen to manipulate a graphical user interface from which a user input might be received.

Control logic 110 includes hardware, software, or a combination thereof for managing the operation of the systolic array 120. For example, the control logic 110 might be operable to interface with stored weights (e.g., weight memory 105) and data corresponding to those weights (e.g., data memory 106). The control logic controls the reading of weights into the systolic array and their storage in the systolic array when appropriate. Additionally, the control logic might control the input of weights or reference to weights (stored or to be stored) when processing data using the systolic array. In some embodiments, as part of controlling the systolic array, the control logic 110 maintains state information and generates state transition plans (e.g., generate state transition plan at 151 and the generated state transition plan 115) to change the state of the systolic array 120. In particular, the current state (e.g., 112) represents the locations of weights in the memory of respective PEs at some point in time (e.g., at the end of processing a set of data). In some embodiments, to process a second set of data a target arrangement of weights (e.g., 113) might be needed. The state transition plan 115 comprises a specification of how to move from the current state (e.g., 112) to the target state (e.g., 113). The state transition plan can be applied to the systolic array 120 at 152 to cause the transition to the target state 153. In some embodiments, only missing values are loaded from memory (e.g., at 154). In some embodiments, missing values are loaded from neighboring/connected systolic arrays.

The weight memory 105 comprises a storage location for weights corresponding to data. Similarly, the data memory 106 comprises a storage location for data that is associated with those weights. The memory 105 and 106 might be separate or might be combined in a single structure. In some embodiments, the memory for 105 and 106 whether separately or combined might be provided with multiple read and/or write ports. The weight memory 105 and data memory 106 may be populated with the necessary data to execute a machine learning processing job using any relevant technique as is known in the art.

The systolic array 120 comprises an array of processing elements where each processing element may be connected to an edge of the systolic array and/or a neighboring processing element. For example, As illustrated, the systolic array 120 comprises 1-N rows and a-n columns where each row and column intersection corresponds to a processing element. In some embodiments, the number of rows is equal to the number of columns such that each row has the same number of PEs as each column. Thus, the systolic array 120 includes 121a-12Nn processing elements.

An example systolic array comprising PEs $111_{00\text{-}22}$ is also illustrated in FIG. 1A. As an initial matter, the systolic array 120 might be populated with weights from the memory 105. The weights or combinations/subsets thereof might be stored in the memory of each PE (See PE $111_{00\text{-}22}$). Additionally, each PE is connected to two or more neighbor PEs to provide a path to exchange/transfer weights to any neighbors. For example, PE $111_{11}$ is connected to PE $111_{10}$, PE $111_{01}$, PE $111_{12}$, and PE $111_{21}$. Additionally, PE $111_{10}$ is connected to PE $111_{00}$, PE $111_{11}$, PE $111_{20}$, and the edge of the systolic array or PE $111_{12}$.

Figure 1B:
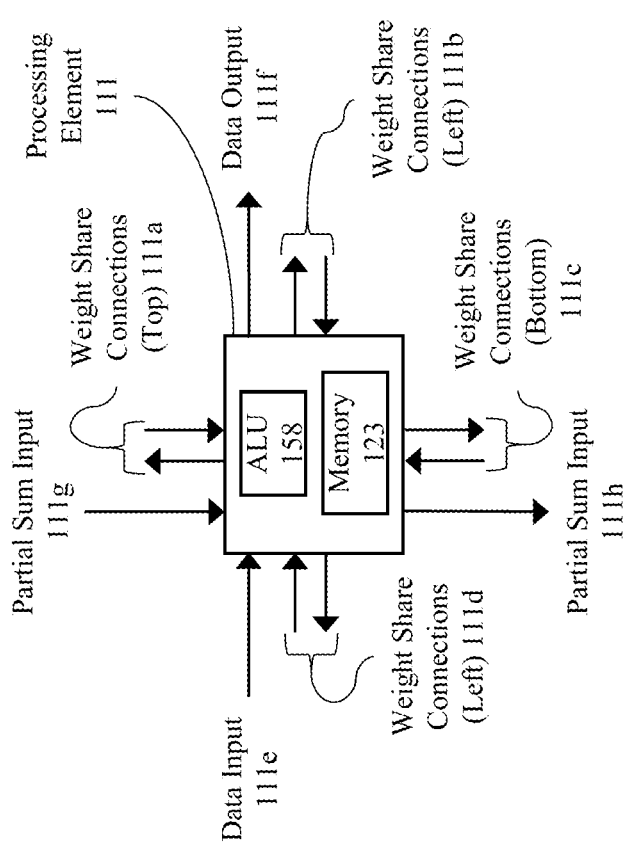
FIG. 1B depicts an example processing element (PE) that might be provided in the systolic array illustrated in FIG. 1A according to some embodiments.

With the training and pruning of weights, the number of bits used to store weights may be relatively small in comparison to the memory needed for the input data. For instance, if there are only N bits for each weight, there are only $2^N$ possible different weight values. In a systolic array with only a single storage element in each processing array, a 96×96 systolic array would be able to store up to 9216 different unique weights. Hence for small N, the chances of the same weight already present on another processing element of the systolic array is very high—e.g., there are only 256 possible values for 8-bit weights. FIG. 1B depicts an example PE and the connection thereof, which will be discussed further.

FIG. 1B depicts an example processing element that might be provided in the systolic array illustrated in FIG. 1A according to some embodiments.

An expanded view of a PE (e.g., PE $111_{00}$) is illustrated. The PE includes weight sharing connections for sending and/or receiving weights between PEs and across edges of the systolic array 120. For example, weight sharing connections 111a-d are provided that allow for sending and receiving weights over any combination of the connections with the from/to the top, right, bottom, or left. In some embodiments, bidirectional lines are provided, where each set of bidirectional lines can either send or receive a single weight at a time. However, illustrated here are separate sets of lines for sending and receiving weights. Additionally, data can be input at 111*e* and output at 111*f*, and partial sums can be received at 111*g* or transmitted at 111*h*.

Each PE also has a memory 123 for storing weights and an arithmetic logic unit (ALU) 158 for performing arithmetic or logical operations for a machine learning processing job. For example, the memory might comprise a random-access memory (e.g., Static RAM or Dynamic RAM) or a set of registers. The memory or registers have one or more storage locations for storing weights. Weights can be received from memory, or from another PE and can be maintained in the memory for multiple clock cycles and operations (e.g., multiple multiply accumulate operations).

Figure 2:
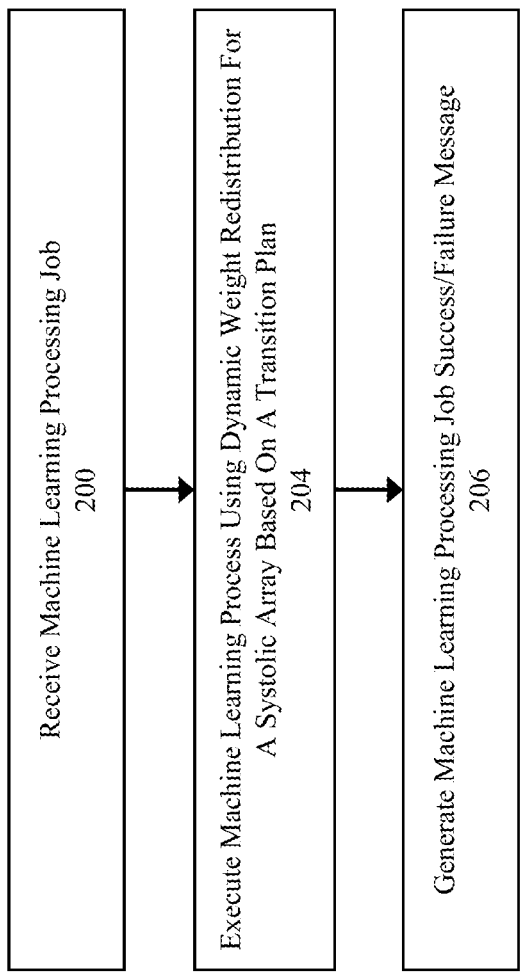
FIG. 2 illustrates a flow for processing machine learning jobs using dynamic redistribution according to some embodiments.

FIG. 2 illustrates a flow for processing machine learning jobs using dynamic redistribution according to some embodiments. Generally, the process works on machine learning processing jobs using dynamic weight redistribution for a systolic array based on a transition plan and outputting a job success or failure message.

The process starts at 200 where a machine learning processing job is received. The machine learning processing job might be received from a user device (e.g., user station 190) either directly or indirectly. For example, the user station 190 might comprise an image or set of images for processing to perform an inference task. For instance, a previously defined neural network might be represented by a plurality of layers having a specific configuration of weights. Thus, a processing job might comprise an image to be processed with a particular trained neural network to determine if the image is of the thing or type of thing the neural network was trained on.

At 204 the machine learning process is executed using dynamic weight redistribution for a systolic array based on a transition plan. This will be discussed further below. Briefly, the process will transition the state of the systolic array by dynamically redistributing weights within the systolic array to conform the systolic array to a state necessary for executing machine learning operations against data to be processed. This process is completed by generating a transition plan and transitioning the locations of weights using said plan. Because there are a limited number of weights and because one of the bottlenecks of current machine learning processing techniques is the memory bandwidth, the reuse of the dynamic weight redistribution approach should decrease the number of cycles required to fetch weights and decrease the amount of power consumed by the machine learning processes.

At 206 a machine learning processing job success/failure message is generated. In some embodiments, the message comprises and a direct indication that the processing job was completed successfully or that the processing job failed. In some embodiments, a success message is represented by a message that moves or indicates that the results of the machine learning processing job are ready/available.

Figure 3:
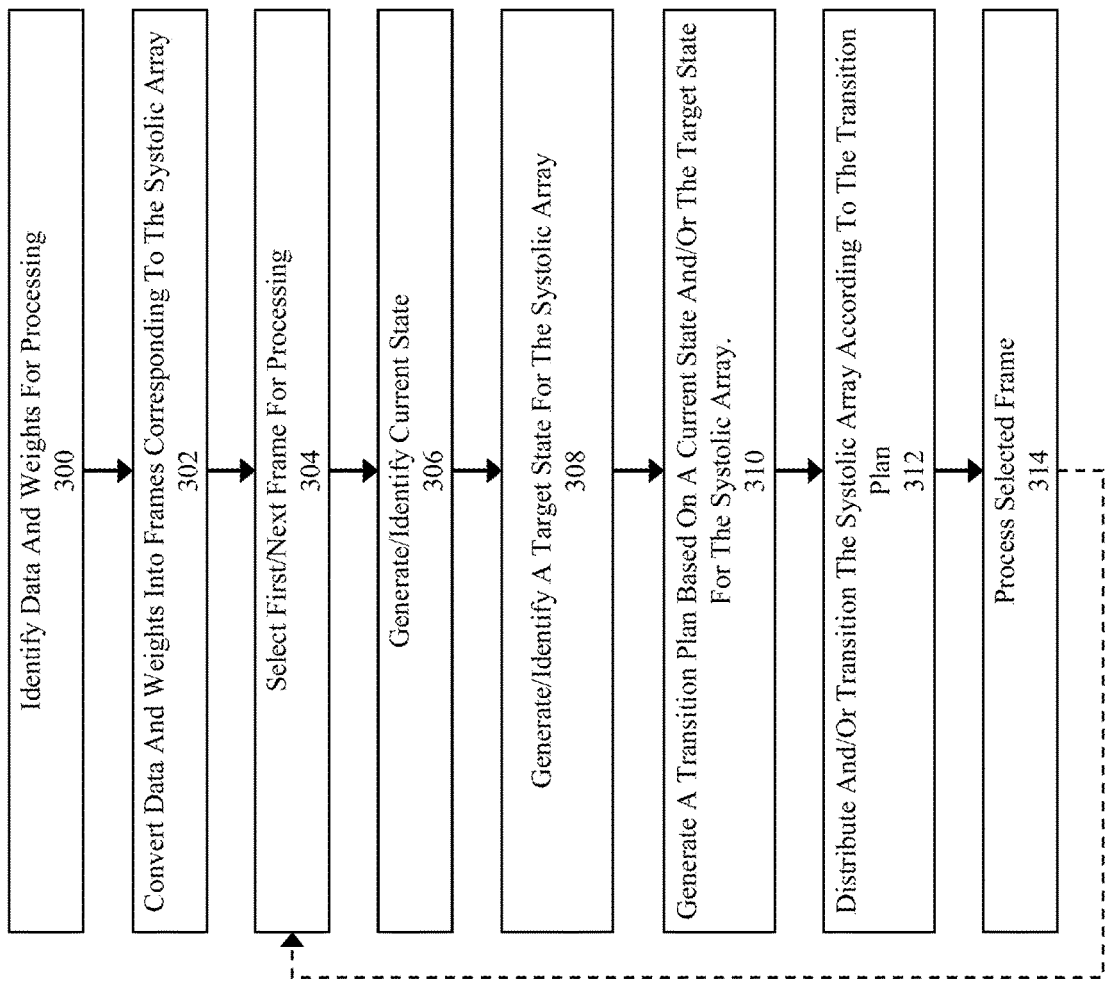
FIG. 3 illustrates an example process flow corresponding to the block titled execute machine learning process using dynamic weight redistribution within the array illustrated in FIG. 2.

FIG. 3 illustrates an example process flow corresponding to the block titled execute machine learning process using dynamic weight redistribution within the array illustrated in FIG. 2.

In some embodiments, the process starts at 300 where data and corresponding weights are identified for processing. The data and weights may be identified based on an input for a user station (e.g., user station 190), based on a previous processing job or configuration, or based on a reference in a memory (e.g., in weight memory 105 or data memory 106).

In some embodiments, at 302 the data and weights might be converted into frames. For example, the data and weights might be folded to fit the size of the active processing elements in the systolic array. For ease of explanation we refer to these folds as frames. A frame is then selected for processing at 304.

At 306 a current state is generated and/or identified. For example, an initial frame might be specified as an initial state for a previously trained model. Specifically, where a previously trained model exists, and the systolic array has a known set of dimensions, a frame could be determined based on the weight distribution prior to execution or even receipt of the machine learning processing job. In this way, an initial state can be provided to the control logic 110. Alternatively, the control logic could analyze the weights and generate a map of the current state on the fly.

At 308 a target state is generated and/or identified. For example, a subsequent frame might be specified as requiring a particular state of weights for a respective trained model. Specifically, where a previously trained model exists, and the systolic array has a known set of dimensions, a subsequent frame could be determined based on the weight distribution prior to execution or even receipt of the machine learning processing job. In this way, an initial state can be provided to the control logic 110. Alternatively, the control logic could analyze the weights and generate a map of the target state on the fly.

At 310 a transition plan is generated based on a current state and/or the target state for the systolic array. This process will be discussed further in regard to FIG. 4. However, briefly, the process comprises mapping routes between processing elements to transmit/exchange weights between processing elements without requiring that weights that are already in the systolic array be fetched from memory. At 312 the systolic array is transitioned according to the transition plan and at 314 the selected frame is processed using the weights that are stored in the systolic array after the transition to the target state. Subsequently, the process may return to 304 when until all the data and weights have been processed.

Figure 4:
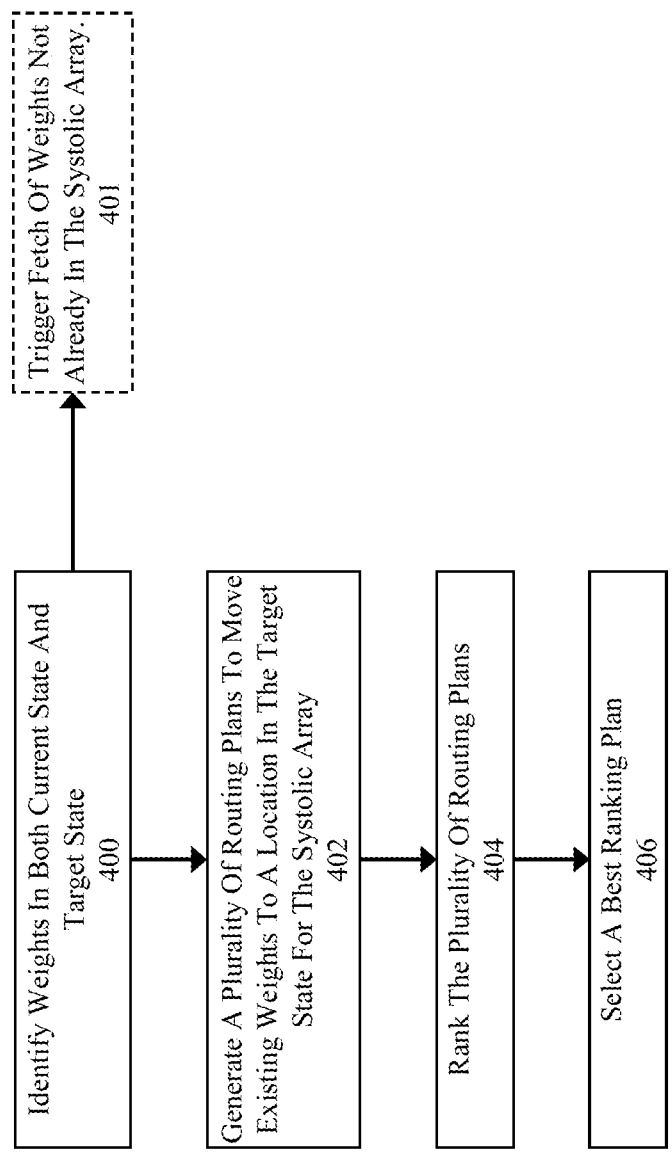
FIG. 4 illustrates an example process flow corresponding to the block titled generate a transition plan based on a current state and/or the target state for the systolic array illustrated in FIG. 3.

FIG. 4 illustrates an example process flow corresponding to the block titled generate a transition plan based on a current state and/or the target state for the systolic array illustrated in FIG. 3.

In some embodiments, the transition plan generation includes identification of any weights that are or will be in both the current state and the target state at 400. Similarly, as part of this process, any weights in the target state that are not already in the systolic array may be fetched at 401.

With the weights that are in both the current state and the target state identified, at 402, a plurality of routing plans are generated for movement of weights to a corresponding location in the target state for the systolic array. For example, for each processing element in the systolic array one or more possible paths to route the specified weight to the processing element are generated. Various different permutations of collections of a respective path for each processing element are then combined to form candidate routing plans. These candidate routing plans are then analyzed to determine if they are possible—e.g., to determine if there are any conflicts between paths in each respective routing plan.

At 404 the plurality of routing plans are ranked according to a metric. The metric might comprise the number of cycles require, the number of transfers/moves required, an estimated power consumption of executing the transition plan, or any other metric. Finally, at 406 a best ranking plan is selected. If there are multiple best ranking plans that any of the best ranking plans may be selected at random or based on where they occur in a data structure.

Figure 5A:
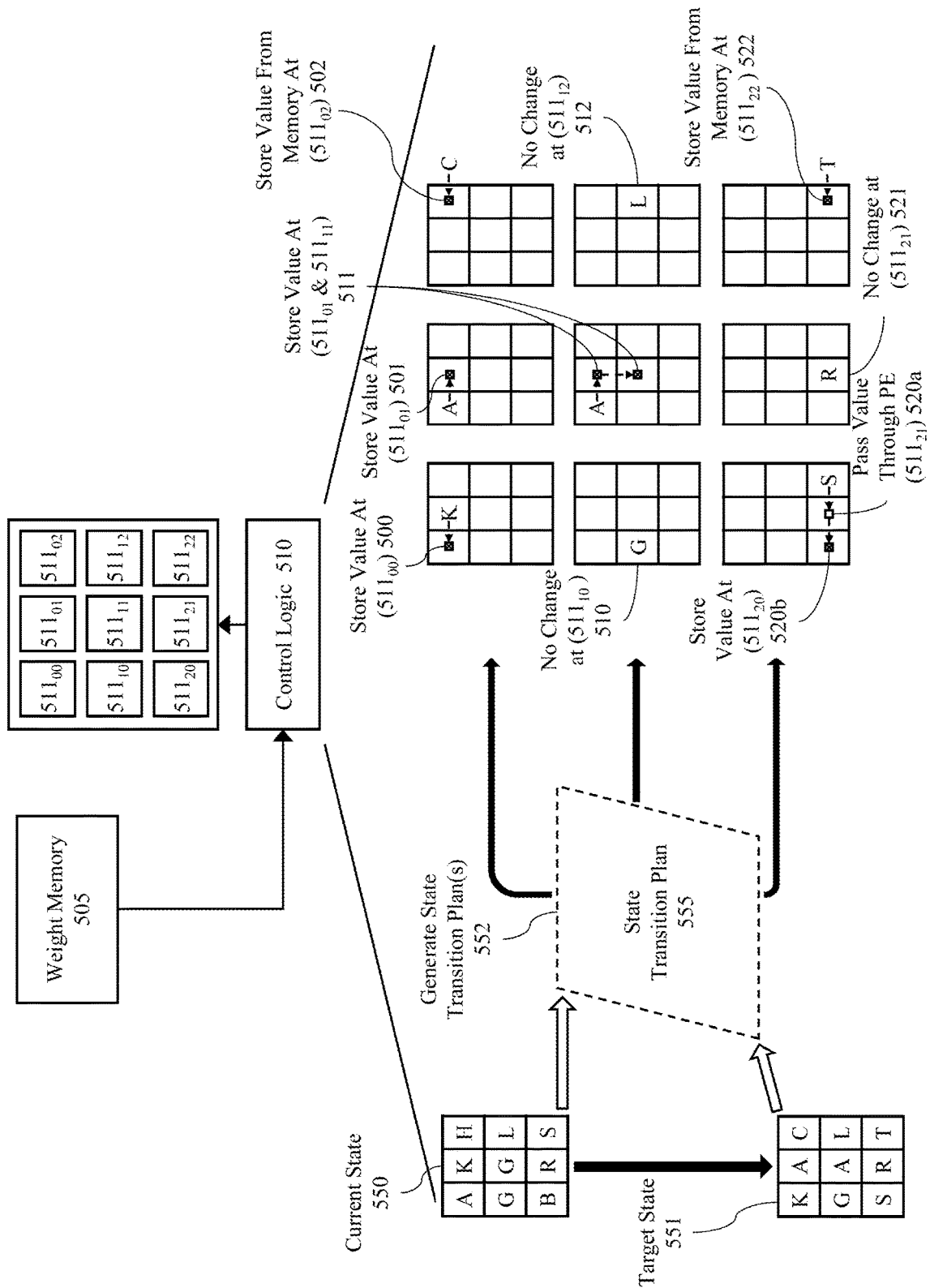

FIGS. 5A-B provides an illustrative example of generating a state transition plan according to some embodiments. Here, for ease of illustration, the example systolic array has nine processing elements and a single weight storage location in each processing element. However, in most systolic arrays each PE would have multiple storage locations and would comprise hundreds if not thousands of PEs.

FIG. 5A provides an illustrative example of a first phase of the state transition plan generation according to some embodiments. In this phase, one or more routing steps are generated that could be used to create a state transition plan.

The systolic array is populated with a plurality of weights from a weight memory 505 via control logic 510. Weight memory 505 is similar to weight memory 105 and thus the above description applies. Similarly, the control logic 510 is similar to control logic 110 and thus that description applies as well. A current state of the weight storage is represented at 550 where different letters represent different weights. Similarly, the target state 551 is represented in the same way.

The illustration also shows how pieces of the state transition plan 555 can be generated at 551. For each storage element, a map can be generated to capture where a weight might be transferred from to get to the corresponding PE. The systolic array 520 illustrated here has nine PEs. $511_{00\text{-}22}$. The PEs can be represented by a location in a grid or table as shown in 550 and 551. The mapping for each individual weight can be shown by overlaying the weight (or location) with a connection direction and a location for storing that weight.

For example, at 500 a state transition plan can include storing a weight (K) at PE $511_{00}$ that was received from the PE $511_{01}$. Similarly, in the other direction, at 501 a weight (A) is stored at PE $511_{01}$ which was received from the PE $511_{00}$. In contrast, at 502 and 522 weights from another location (e.g., memory) are stored at the corresponding processing elements (see $511_{02}$ & $511_{22}$ respectively). In some circumstances, processing elements may already have the necessary weights stored at the particular PE—see e.g., 510, 512, and 521 where PEs $511_{10}$, $511_{12}$, and $511_{21}$ already have the necessary weights and thus, no change will occur. In some embodiments, weights may need to pass through multiple PEs to get to the target location. For example, at 520b a weight (S) that was passed through an intermediary location without persisting the weight at the intermediary location (see 520a indicating passing the value through PE $511_{21}$) is storage at PE $511_{20}$. However, in some instances, a value may also be passed through/to multiple PEs and be stored at two or more of those PEs. For instance, at 511 a weight (A) is passed to and stored at PE $511_{11}$, but that weight was also stored at PE $511_{01}$ (see 501).

The approach illustrated herein represents only one possible set of routing operations that might together comprise a state transition plan (e.g., 555). However, various different approaches could be taken. For example, for each PE or weight, a plurality of routing paths could be generated that meet or deviate by some maximum number of steps (e.g., 3 cycles/steps). This would ensure that each weight that needs to be transferred that is in the array will have at least one associated path that might possibly be utilized. However, this also avoids generating and analyzing paths that might have an otherwise excessive number of steps.

FIG. 5B provides an illustrative example of a second phase of the state transition plan generation according to some embodiments. In this phase, different combinations of paths are combined to generate a plurality of routing plans. However, FIG. 5B illustrates only one example state transition plan based on the steps identified in FIG. 5B

As illustrated here, the paths identified in FIG. 5A are converted to a set of nodes and directional edges at 561. This makes it easier to analyze the routing plan to identify a conflict between an overlapping portion of the graph. For instance, if the systolic array includes only PEs with a single path in each direction, then if the generated graph includes a directional edge that is annotated with two weights or there are two edges from a node in the same direction from a single node a possible conflict exists. Here, there are no conflicts as each processing element can both send and received a weight in a single cycle.

Thus, 561 each PE within the systolic array is represented by a node. Nodes that have no edges connected to them will not send or received any weights (see e.g., nodes for PEs $511_{10}$ and $511_{12}$). Nodes that have an incoming edge that is not connected to another node will receive weights from memory (see e.g., nodes for PEs $511_{02}$ and $511_{22}$). Nodes that have an edge connection from another node will receive a weight. Those nodes are also annotated to indicate whether the node stores the weight. For example, the weight (K) is send from PE $511_{01}$ to PE $511_{00}$. As indicated by the weight (K) in the node, the node will store the received weight. Similarly, weight (A) is transferred from PE $511_{00}$ to PE $511_{01}$, and then PE $511_{11}$ while being stored at both locations. In contrast, the weight (S) is passed through PE $511_{21}$ without perpetuation of the value at that location but is instead passed through to PE $511_{02}$.

FIGS. 6A-C provide an illustrative example of a conflict resolution process for an illustrative state transition plan according to some embodiments.

FIG. 6A illustrates the identification of a possible conflict for a state transition plan. In particular, the figure illustrates the same weight memory 505, controller logic 510, and the systolic array comprising PEs $511_{00\text{-}22}$ as shown in FIGS. 5A-B. However, here the current state 650 and target state 651 are different from those illustrated in FIGS. 5A-B at 550 and 551 respectively. Thus, during the generation of a state transition plan a different result might arise including a possible or actual conflict.

Graph 661 provides an illustration of one possible transition plan represented as a graph of nodes and edges. Here, the weights (A, C, L, S, R, and T) as indicated in the nodes corresponding to PEs $511_{01}$, $511_{02}$, $511_{12}$, $511_{20}$, $511_{21}$, and $511_{22}$. However, the weight (T) needs to be stored at PEs $511_{11}$, and $511_{00}$, while the weight (C) needs to be storage at $511_{10}$. The graph 661, illustrates that weights C and T are both to be transferred from PE $511_{11}$ and to $511_{10}$, as represented by the directional edge annotated with two weights (C and T) at 601 which corresponds to a possible conflict.

FIG. 6B further illustrates an approach to determine is the possible conflict is an actual conflict according to some embodiments.

In particular, FIG. 6 illustrates the determination of the corresponding cycle over which the weights (C and T) are to be transferred over the connection at 602. If the weights (C and T) are to be transferred over the same cycle, then there is an actual conflict. However, if the weights (C and T) are to be transferred over different cycles there is no conflict. Thus, each edged of graph 661 is annotated with the corresponding cycle in which the edge is to be used. In a first cycle, the weight (C) is to be transferred from PE $511_{02}$ to PE $511_{12}$, while the weight (T) is to be transferred from PE $511_{22}$ to PE $511_{21}$ of which the edges are annotated accordingly. A similar operation occurs for the second cycle, where the weights C and T are to be transferred to PE $511_{11}$ from PEs $511_{12}$ and $511_{21}$ respectively. In a third cycle, both weights (C and T) are to be transferred from PE $511_{11}$ to PE $511_{10}$. Since, in this example there is only one weight that can be transferred between two PEs in a single direction and cycle, this represents an actual conflict. Lastly, in a fourth cycle T is to be transferred from PE $511_{10}$ to PE $511_{00}$.

FIG. 6C illustrates one possible approach on how to address the possible conflict that was identified as an actual conflict. However, this is only one approach. For example, if a plurality of routing plans are generated then a plan with a conflict might merely be discarded in favor of a plan that does not have a conflict.

If only a single routing plan is generated or all routing plans contain conflicts, a conflict resolution process might be used to generate a routing plan from a routing plan that includes a conflict using a conflict resolution process. For example, the possible conflict 601 has been identified as actual conflict 603. One of the weights corresponding to the conflict is selected for rerouting—here we select the weight (C). An alternative path that does not include the edge between PEs $511_{11}$ and $511_{10}$ over the third cycle is selected. Here, this comprises the weight (C) being routed from PE $511_{02}$ through PEs $511_{01}$ and $511_{00}$, and to PE $511_{01}$. Subsequently, the alternate routing plan may then be analyzed to determine if there are any possible or actual conflicts.

Thus, the approaches illustrated and discussed regarding FIGS. 5A-6C provide an approach for reusing weights within a systolic array, which is in contrast with prior techniques that require that all weights be loaded from memory whenever data is loaded from memory.

SYSTEM ARCHITECTURE OVERVIEW

Figure 7:
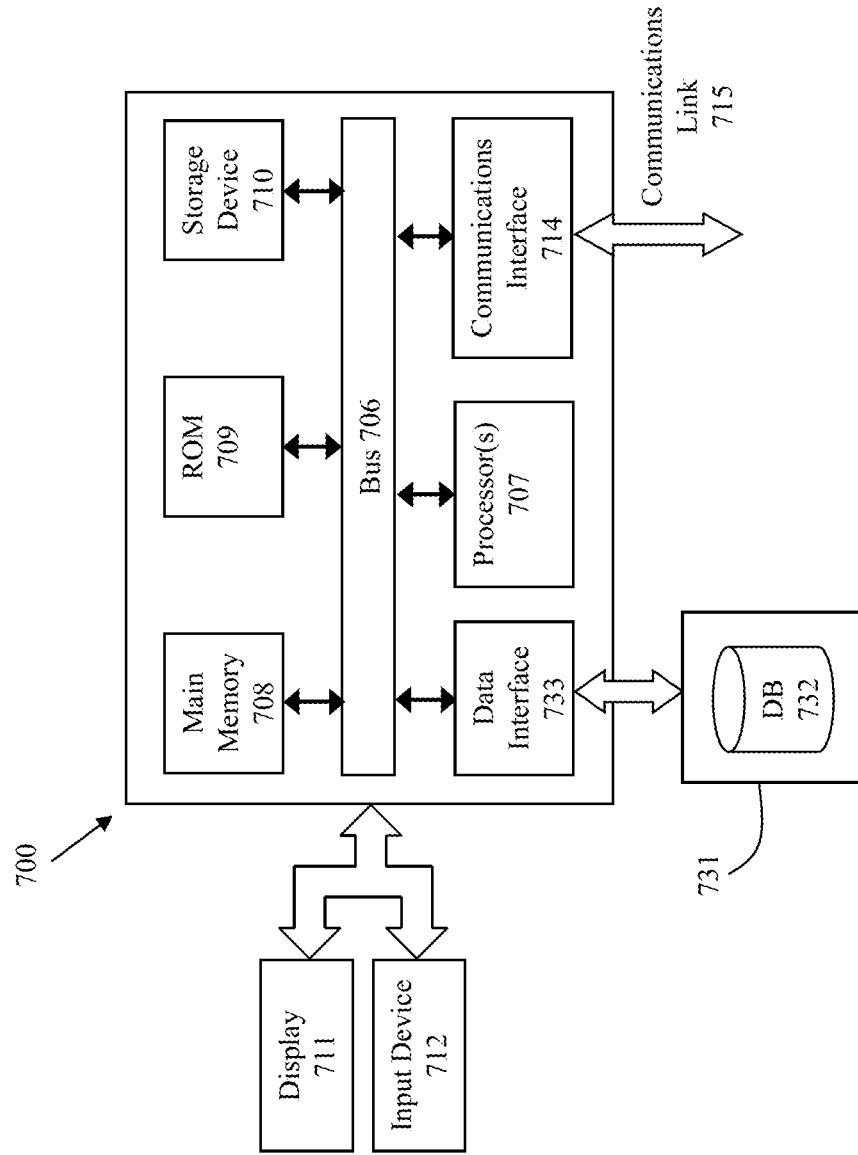
FIG. 7 shows an architecture of an example computing system with which the invention or parts of the invention may be implemented.

FIG. 7 shows an architecture of an example computing system with which the invention or parts of the invention may be implemented.

Computer system 700 includes a bus 706 or other communication mechanism for communicating information, which interconnects subsystems and devices, such as processor 707, system memory 708 (e.g., RAM), static storage device (e.g., ROM 709), storage device 710 (e.g., magnetic or optical disk drives), communication interface 714 (e.g., modem or Ethernet card), display 711 (e.g., CRT or LCD), input device 712 (e.g., keyboard), and cursor control.

According to one embodiment of the invention, computer system 700 performs specific operations by processor 707 executing one or more sequences of one or more instructions contained in system memory 708. Such instructions may be read into system memory 708 from another computer readable/usable medium, such as ROM 709 or storage device 710. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as storage device 710. Volatile media includes dynamic memory, such as system memory 708.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 700. According to other embodiments of the invention, two or more computer systems 700 coupled by communication link 715 (e.g., LAN, PTSN, or wireless network) may perform the sequence of instructions required to practice the invention in coordination with one another.

Computer system 700 may transmit and receive messages, data, and instructions, including program, i.e., application code, through communication link 715 and communication interface 714. Received program code may be executed by processor 707 as it is received, and/or stored in storage device 710, or other non-volatile storage for later execution. Computer system 700 may communicate through a data interface 733 to a database 732 on an external storage device 731.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Thus, disclosed here is a multimodal systolic array that can be used to decrease the amounts of memory bandwidth required to fetch the data and weights by providing a systolic array that can reuse weights already stored in the systolic array. This lowers the bandwidth requirements for weight memory by allowing weights that have previously been read into the systolic array to be reused.

What is claimed is:

1. A machine learning apparatus, comprising:
   a controller and a systolic array, the systolic array having a plurality of processing elements; and
   one or more storage locations for storing weights at each processing element of the plurality of processing elements, wherein the systolic array executes a machine learning processing job using weight redistribution for the systolic array based on a transition plan, the transition plan is generated based on a current state and a target state of weights in the systolic array and specifies one or more operations to reorganize weights in the systolic array to conform to the target state of the systolic array, the operations to reorganize weights in the systolic array comprising at least moving a first weight in a first processing element to a second processing element, and the controller generates an output indicating whether the machine learning processing job was successful or failed.

2. The machine learning apparatus of claim 1, wherein only weights that are not already in the systolic array are loaded from memory.

3. The machine learning apparatus of claim 1, wherein the transition plan comprises at least a planned read operation from a first storage location of a first processing element and a planned write operation to a second storage location of a second processing element.

4. The machine learning apparatus of claim 3, wherein the transition plan comprises a plurality of nodes and edges.

5. The machine learning apparatus of claim 3, wherein the transition plan is generated based on a current state of the systolic array and a target state of the systolic array.

6. The machine learning apparatus of claim 3, wherein generating the transition plan comprises generating a plurality of routing plans.

7. The machine learning apparatus of claim 6, wherein generating the transition plan further comprises ranking the plurality of routing plans and selecting a best ranked transition plan from the plurality of ranked transition plans.

8. A method, comprising:
receiving a machine learning processing job;
executing the machine learning processing job using weight redistribution for a systolic array based on a transition plan, wherein the transition plan is generated based on a current state and a target state of weights in the systolic array and specifies one or more operations to reorganize weights in the systolic array to conform to the target state of the systolic array, the operations to reorganize weights in the systolic array comprising at least moving a weight in a first processing element to a second processing element; and
generating an output indicating whether the machine learning processing job was successful or failed.

9. The method of claim 8, wherein only weights that are not already in the systolic array are loaded from memory.

10. The method of claim 8, wherein the transition plan comprises at least a planned read operation from a first storage location of a first processing element and a planned write operation to a second storage location of a second processing element.

11. The method of claim 10, wherein the transition plan comprises a plurality of nodes and edges.

12. The method of claim 10, wherein the transition plan is generated based on a current state of the systolic array and a target state of the systolic array.

13. The method of claim 10, wherein generating the transition plan comprises generating a plurality of routing plans.

14. The method of claim 13, wherein generating the transition plan further comprises ranking the plurality of routing plans and selecting a best ranked transition plan from the plurality of ranked transition plans.

15. A non-transitory computer readable medium, having stored thereon a set of configuration information for configuring a gate array or generating an application specific integrated circuit, the set of configuration information, when implemented performs a set of acts, the set of acts comprising:
receiving a machine learning processing job;
executing the machine learning processing job, wherein a transition plan is used to redistribute weights stored in a systolic array, wherein the transition plan is generated based on a current state and a target state of weights in the systolic array and specifies one or more operations to reorganize weights in the systolic array to conform to the target state of the systolic array, the operations to reorganize weights in the systolic array comprising at least moving a weight in a first processing element to a second processing element; and
generating an output indicating whether the machine learning processing job was successful or failed.

16. The computer readable medium of claim 15, wherein only weights that are not already in the systolic array are loaded from memory.

17. The computer readable medium of claim 15, wherein the transition plan comprises at least a planned read operation from a first storage location of a first processing element and a planned write operation to a second storage location of a second processing element.

18. The computer readable medium of claim 17, wherein the transition plan comprises a plurality of nodes and edges.

19. The computer readable medium of claim 17, wherein the transition plan is generated based on a current state of the systolic array and a target state of the systolic array.

20. The computer readable medium of claim 17, wherein generating the transition plan comprises generating a plurality of routing plans, ranking the plurality of routing plans, and selecting a best ranked transition plan from the plurality of ranked transition plans.

* * * * *